Dec. 29, 1925.

H. PIEPER

ELECTROPNEUMATIC BRAKE

Filed July 1, 1922

1,567,614

5 Sheets-Sheet 2

Inventor
H. Pieper
By
Langner, Parry, Card + Langner
Attys.

Dec. 29, 1925.

H. PIEPER 1,567,614

ELECTROPNEUMATIC BRAKE

Filed July 1, 1922     5 Sheets-Sheet 3

Inventor:
H. Pieper
By
Langner, Parry, Card & Langner
Attys

Dec. 29, 1925. 1,567,614
H. PIEPER
ELECTROPNEUMATIC BRAKE
Filed July 1, 1922 5 Sheets-Sheet 5
Fig. 11.
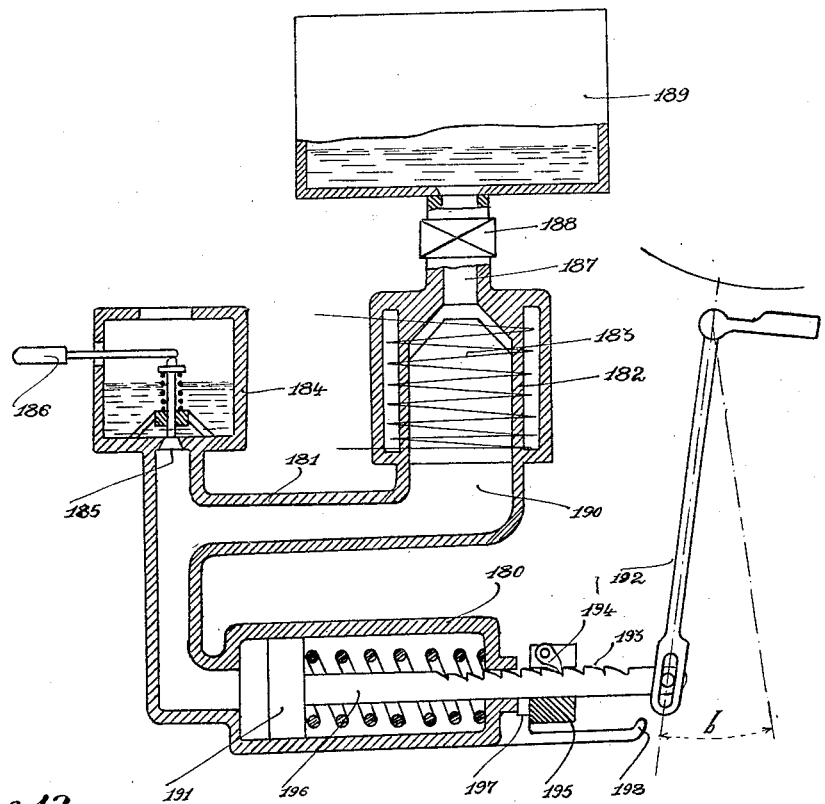
Fig. 12.
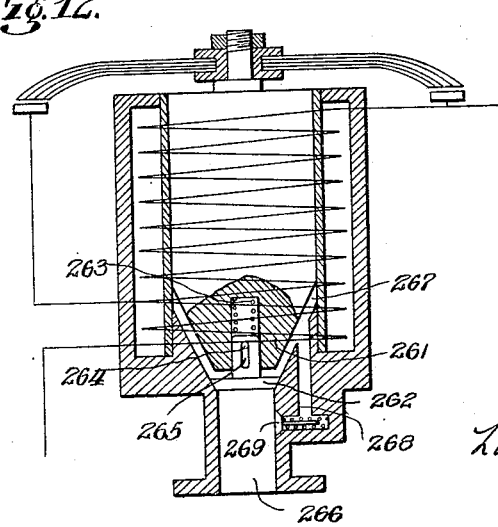
Fig. 13.
Inventor
H. Pieper
By
Langner, Parry, Card & Langner
Attys.

Patented Dec. 29, 1925.

1,567,614

UNITED STATES PATENT OFFICE.

HENRI PIEPER, OF LIEGE, BELGIUM, ASSIGNOR TO COMPAGNIE INTERNATIONALE DES FREINS AUTOMATIQUES, SOCIÉTÉ ANONYME, IN LIEGE, BELGIUM.

ELECTROPNEUMATIC BRAKE.

Application filed July 1, 1922. Serial No. 572,219.

*To all whom it may concern:*

Be it known that I, HENRI PIEPER, a subject of the King of Belgium, and resident of Liege, in the Kingdom of Belgium, have invented certain new and useful Improvements in Electropneumatic Brakes; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

Electrical controlled pneumatic brakes are known in which an electro-magnet or an electric motor acts in such a way that a reservoir feeding the brake cylinder is filled again during the releasing operation so that the pressure of air is restored again and so that the braking effect during the braking operation may be controlled by means of the electro-magnet or by the motor acting against the air pressure operating the shoes, or by a valve actuated by an electro-magnet controlling the feeding of the brake cylinder.

The invention relates more specially to means for utilizing braking systems of the above character in trains, and particularly, in trains comprising a relatively great number of cars. Practice has shown that it is advantageous for such long trains, to connect in series the electro-magnets controlling the air current and the solenoids acting upon the brake pistons, and to use the rails as return conductor.

Figure 1:
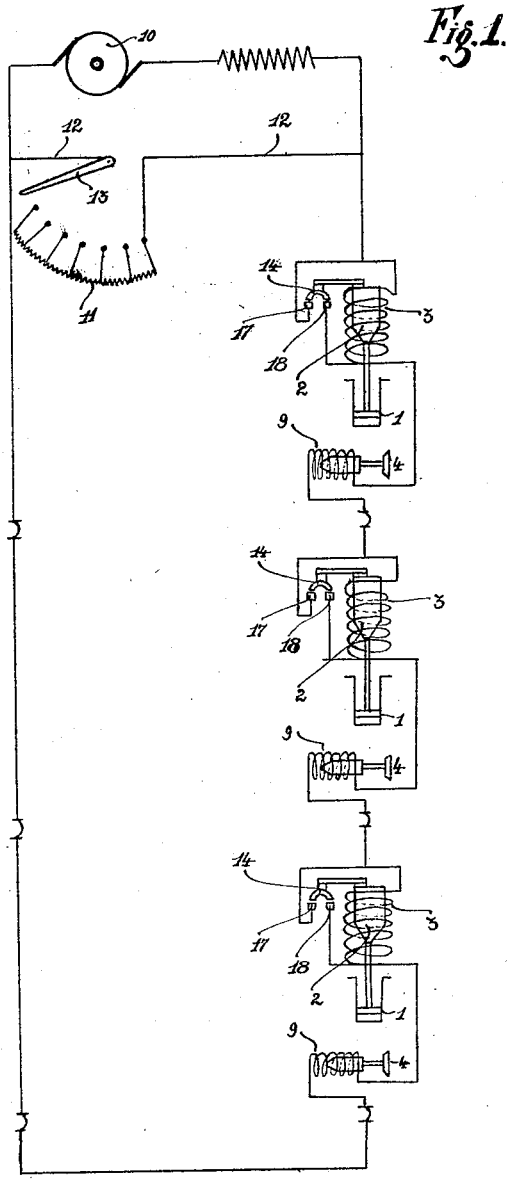
Figure 2:
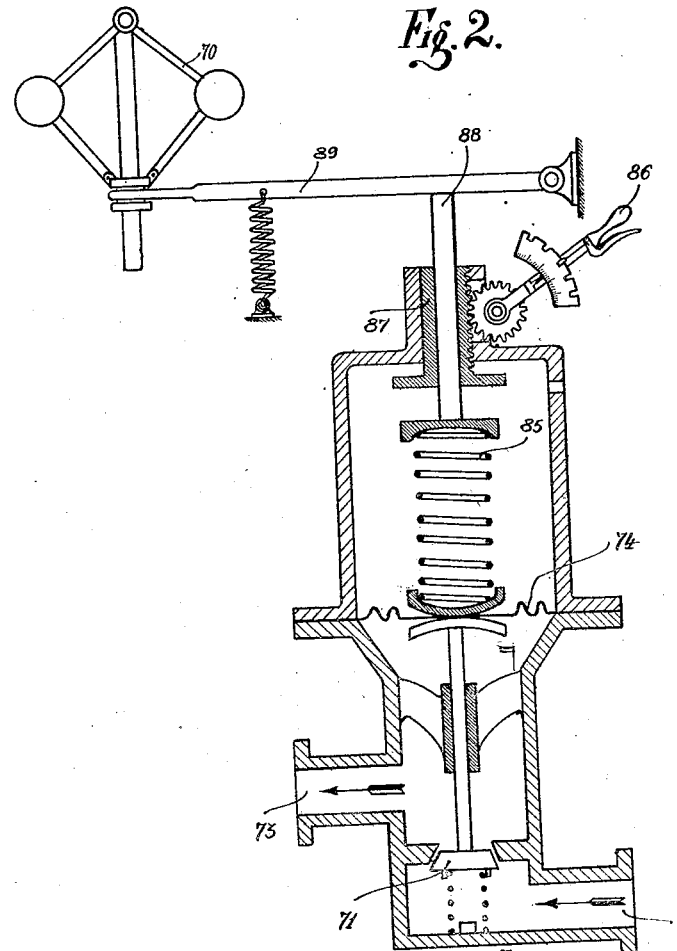
Figures 9, 10:
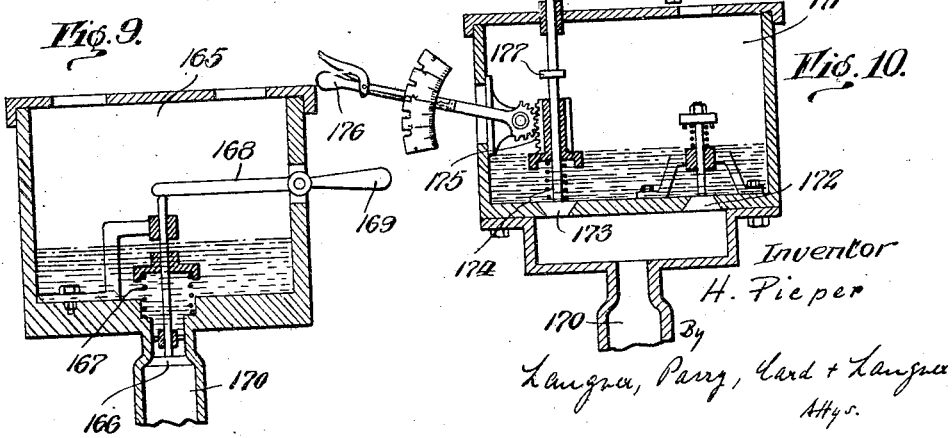
Figure 3:
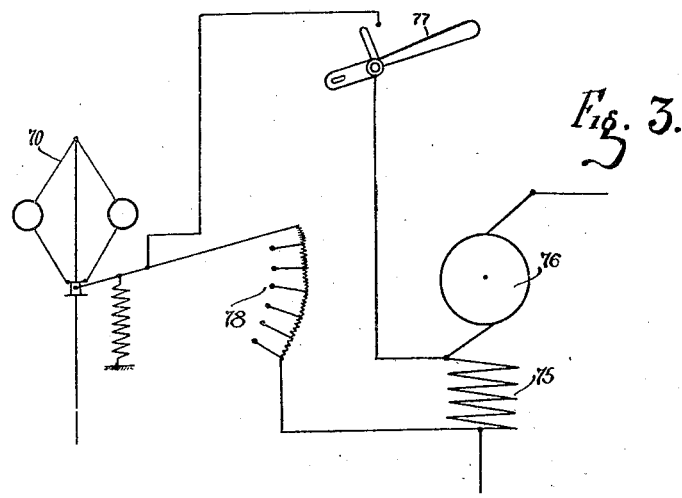
Figure 4:
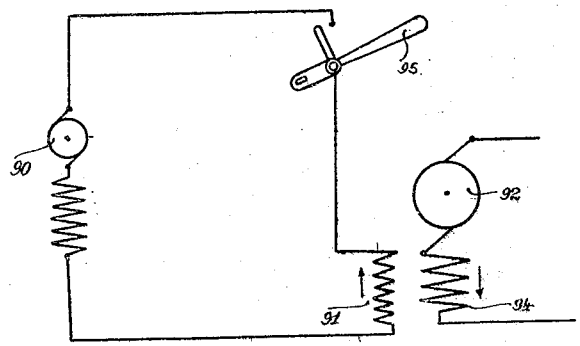
Figure 5:
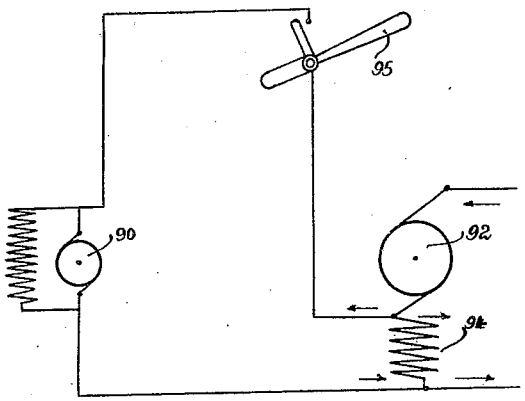
Figure 6:
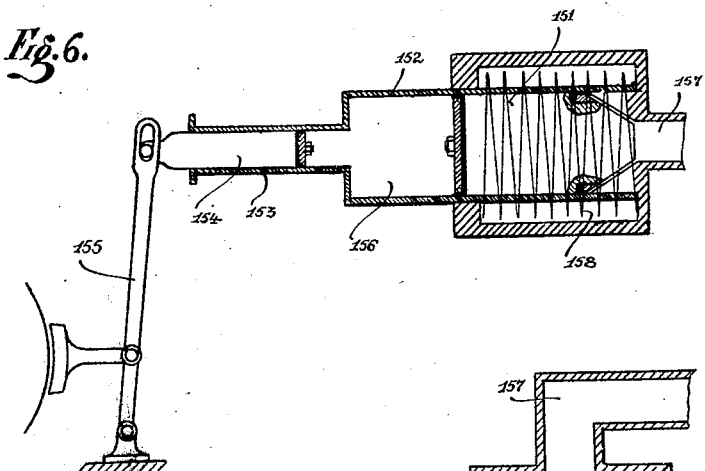
Figure 7:
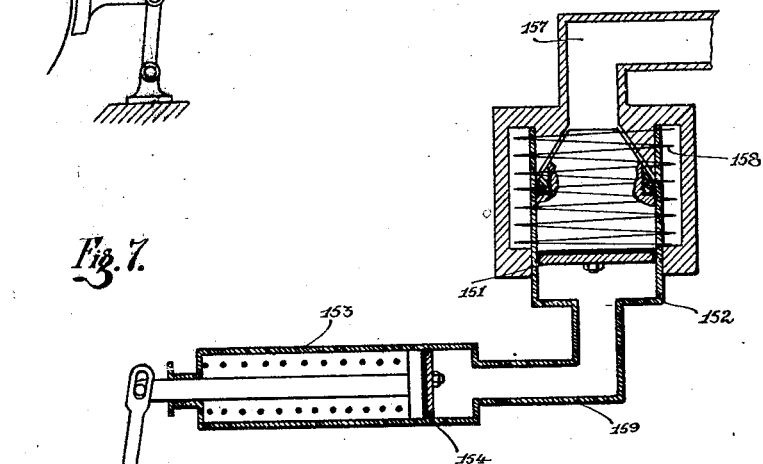
Figure 8:
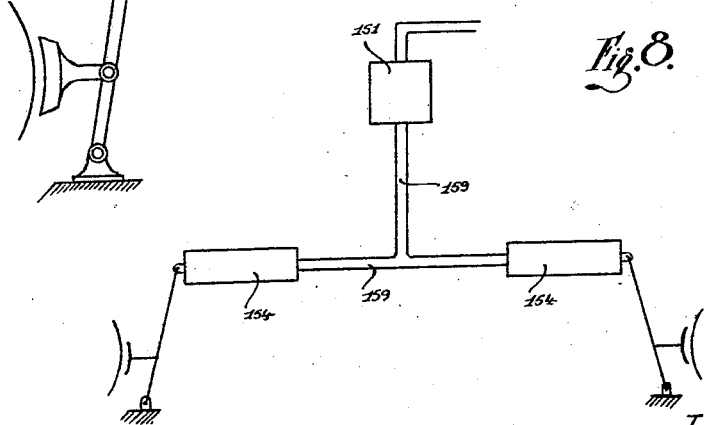

In order that the invention may be clearly understood it will now be described with reference to the accompanying drawings in which, Fig. 1 is a diagrammatic view illustrating the series connection of electro-magnets and solenoids according to the present invention. Fig. 2 is a similar view of a device allowing an automatic adjustment of the pressure of the brake blocks on the rim of the wheel to the speed of the train. Fig. 3 is a view of a similar arrangement for obtaining the same results by shunting the excitation of the dynamo. Fig. 4 is a diagrammatic view of an arrangement comprising an auxiliary dynamo. Fig. 5 shows an arrangement similar to that of Fig. 4, in which the current of the auxiliary dynamo flows in opposite direction to the principal current. Figs. 6 to 8 are diagrammatic views of the devices for reducing the power of the solenoids and the capacity of the reservoirs. Figs. 9 and 10 are diagrammatic views of an auxiliary fluid reservoir. Fig. 11 is a similar view of a device allowing the angle of oscillation of the transmitting mechanism to remain independent of the lost motion between the blocks and the wheels. Fig. 12 is a diagrammatic view of a device allowing reduction of the number of ampere turns required to hold the solenoid core in its position at the end of its travel. Fig. 13 shows a diagrammatic view of the electrical connections of the device of Fig. 12.

According to Fig. 1 the solenoids 3, whose cores are connected to the brake pistons 1, and the electro-magnets 9, controlling the valves 4, which control the supply of air to the brake cylinders, are all in series connection with a series-dynamo 10, placed on the locomotive of the train and driven by a small steam engine the speed of which is variable, but the motor couple is constant.

Consequently if any additional cars are connected to the train, the voltage of the current supplied by the dynamo 10 increases, but its intensity does not vary.

The regulation of the intensity of the current may be effected by shunting more or less the circuit by means of a resistance 11 provided with a lever switch 13 and put in parallel with the dynamo by the wire 12.

The intensity of the braking will be the more, the less the intensity of the current.

The switches 17 and 18 are provided for putting in short circuit the solenoid 3 at the end of its travel in the brake cylinder.

The series connection or the series parallel connection of electro-magnets and solenoids according to the present invention as shown in the Fig. 1 prevents difficulties from the electrical point of view which arise by the application to long trains of the brake system of the class referred to. It is not only possible by the utilization of this arrangement to control different brakes of the train from a single stand, for instance, from the locomotive and to brake all cars at the same time, but to regulate the braking and the releasing operations with relation to the speed and the load of the train, and to obtain the automatic adjustment of the energy supply to the number of cars. The consumption of energy will also be reduced to the minimum.

These results are obtained by supplying current to the solenoids of the brake by one or two dynamos, which may be disposed on the locomotive or on the head car and driven in any suitable manner by a steam engine supplied with steam from the locomotive boiler, the solenoids being series or parallel series connected.

In this way, it is possible to attain the automatic adjustment of the brake pressure to the speed of the train. It is known that the coefficient of friction of the braking blocks on the wheels increases considerably by the decreasing of the speed of the train. Therefore it is very important that the highest pressure which the motorman can effect upon the braking blocks should be in relation to the corresponding coefficient of friction for any speed of the train. For that purpose the decreasing of the pressure upon the braking blocks to that corresponding to the lowest speed of the train has to be realized automatically and independently of the motorman.

According to the present invention these results can be attained by the following arrangement.

As known, for effecting braking operation the motorman can operate the steam reducing valve disposed between the locomotive boiler and the engines producing the constant current for supplying the brakes. To this end, he reduces the steam pressure of the engine of the electrical group which decreases the current intensity and puts the brakes in action.

According to the present invention said reducing valve is controlled by a regulator controlled by the speed of the train, as for instance a centrifugal regulator driven by an axle of the locomotive or of any one of cars and the velocity of which is in relation with the speed of the train. An embodiment of such an arrangement is shown in Fig. 2.

The centrifugal regulator 70 acts to press the spring 85 of the reducing valve down in proportion to the decreasing of the speed of the train. On the other hand the motorman presses the said spring 85 down by actuating the operating handle 86 which permits lowering the mantle 87 whereby the spring 85 is pressed down independently of the action of the regulator. The spring 85 acts through the medium of an elastic membrane 74 on the valve 71 disposed between the passages 72 and 73 and controlling the supply of steam from the boiler to the steam engine driving the dynamos. When the brake must be released, the motorman presses the spring 85 down by means of the operating handle so as to bring the valve 71 in its lowest position for supplying the engine with steam at suitable pressure, the current reaching thereupon the highest intensity.

In the braking operation, the handle 86 is moved so as to allow the spring 85 to be compressed by fluid pressure under diaphragm 74 and the valve 71 to be lifted by its spring the pressure of steam is diminished whereby the intensity of the current supplied by the dynamo decreases.

If an emergency application of brakes is wanted, the operating handle is turned by the motorman quite downwards so as to move the mantle 87 into its highest position whereby the spring 85 is compressed by fluid pressure under diaphragm 74 and the rod 88 moved upwards by the action of said spring 85 until it buts against the lever 89 actuated by the centrifugal regulator. The position of the lever 89 being dependent on the speed of the train, it is clear that the spring 85 will not be quite depressed even if the motorman has turned the operating handle so as to depress it completely unless the train has at this moment its highest speed. According to the decrease of the speed of the train the regulator will gradually press the spring 86 down and, therefore, the pressure of steam and consequently the intensity of current in the solenoids will increase and the pressure on the braking blocks thereupon will be diminished.

It is easy to see, that the arrangement as described allows the braking blocks to be automatically pressed against the wheels with a pressure depending on the speed of the train without preventing rotation of the axles by the brake blocks.

The Fig. 3 is a diagrammatic view of another arrangement for realizing an automatic self-regulation of the braking pressure with regard to the speed of the train.

According to this figure, the centrifugal regulator 70 controls more or less the excitation 75 of the dynamo 76 by shunting more or less the resistance 78 instead of controlling the supply of fluid to the steam engine, as hereinbefore described. In this arrangement the circuit will be closed by the motorman by means of the switch 77 operated at the moment of braking. The centrifugal regulator 70 transmits its displacements to the movable lever switch of the resistance 78 connected in parallel to the excitation 75. The dynamo 76 supplies the current to the solenoids of the brakes of different cars connected in series and this arrangement acts in the same manner as in the case of Fig. 2.

In another embodiment of the present invention, as illustrated in Fig. 4, the centrifugal regulators of Figs. 2 and 3 are dispensed with and replaced by an auxiliary dynamo 90, whose current is supplied to the demagnetizing winding 91 acting on the magnetic field 94 of the dynamo 92. This auxiliary dynamo 90 may be driven by any suitable axle of the train. The circuit of the dynamo 90 can be closed for braking by the motorman manually operating the switch 95.

It will be seen that by decreasing the speed of the train the magnet fields 94 of the principal dynamo 92 will increase in a certain amount and the pressure upon the braking blocks will be diminished at the same rate.

According to the modification of the invention shown in Fig. 5, the current of the auxiliary dynamo 90 is sent in a direction opposite to that of the magnet field winding 94 of the principal dynamo 92 so as to diminish the intensity of this magnet field 94 when the train runs at its high speed and to render the same stronger on decrease of speed of the train.

It will be understood that other arrangements may be imagined and various modifications may be made to obtain the same results without departing from the principle of the invention comprising controlling the intensity of the current in the solenoids during the braking operation by the variation of speed of the train so that the intensity of current increases by decreasing speed of the train and vice-versa.

The arrangements shown in Figs. 6 to 8 permits diminishing considerably the power of the solenoids and the capacities of air and oil reservoirs, which is of great importance for long trains and thereby facilitates the application to such trains of brakes of the kind herein described.

For this purpose the application of the brake blocks is made in two steps, the first comprising the displacement of the blocks towards the wheels and their application thereon and the second consisting in effecting a gradually increasing pressure upon the blocks. It is obvious that the first operation requires but a little effort to overcome the resistance of friction in the transmitting mechanism and that of opposing springs. The second operation requires on the contrary an application of gradually increasing pressure upon the blocks.

It is therefore unnecessary to spend during the first operation the same power and pressure as required for the braking operation proper.

Fig. 6 shows diagrammatically an arrangement provided for this purpose, in which the solenoids operate the brake bars by means of a special brake piston and an intermediate fluid. The piston 151 disposed in the cylinder 158 is operated by the solenoid 159. The cylinder 158 terminates in second cylinder 153 whose diameter is less than that of cylinder 158.

A piston 154 moves in the cylinder 153 and is connected to the brake blocks by means of a bar 155. The chamber 156 between the pistons 151 and 153 is filled with any appropriate fluid, such as oil. The piston 151 is pushed forwards by oil coming under pressure from the oil reservoir by way of the passage 157 and actuates through the medium of oil contained in the chamber 156 the small piston 154 so that the travels of each of said pistons are dependent upon their respective diameters.

It will be easily understood that said arrangement has the advantage of providing a solenoid core of little travel and big diameter, whereby the power of said solenoid is considerably diminished and the dimensions are reduced for the same amount of work.

In the modification of the same arrangement shown in Fig. 7, the cylinder 152 of the solenoid 158 is separate from the cylinder 153 of the brake piston 154 and connected to said cylinder by a conduit 159. Thus it is evident that the solenoid 158 may be disposed at any suitable place on the car, the brake cylinder 153 being disposed near the transmitting bar 155.

Another embodiment of the same arrangement is shown diagrammatically in Fig. 8 with that difference that a single piston 151 of the solenoid 158 is adapted to operate two brake pistons 154. It is thus possible in case of a car provided with bogies to operate by a single solenoid the brake cylinders of each bogie; said cylinders being connected by conduits 159. Moreover, there is no objection to operate any desired number of brake cylinders by means of a single solenoid, the pressure exerted by different brake cylinders being the same provided that their diameters are equal.

The interposition of fluid between the brake piston and the service piston of the solenoid according to Figs. 6 to 8 gives another advantage, which is particularly important for long trains equipped with brakes of the present class.

As shown in Fig. 9, a reservoir 165 communicating with atmosphere may be connected by the duct 170 with the chambers 156 of Fig. 6 or with the duct 159 of Figs. 7 and 8. The reservoir 165 is provided with an automatic valve 166 which is held closed by the action of a spring 167. The said valve 166 allows during the releasing operation a certain quantity of liquid to be introduced into the chamber 156 of Fig. 6 or into the ducts 159 of Figs. 7 and 8 in case slight leakage would have taken place.

It is obvious that the valve 166 does not act as long as the space between the service piston 151 and the braking piston 154 (Figs 6, 7 and 8) is filled with liquid.

A lever 168 operated by the handle 169 operates to lower the valve 166 so as to open the passage to the fluid. If one car is disconnected from the train or the releasing operation failing from any cause, the brakes may be released by opening the valve 166 without being obliged to displace the service piston.

It will be readily understood that by opening the valve 166 the pistons 151 of Figs. 6, 7 and 8 moved back by the reaction of the transmitting mechanism and the opposing springs, force through the passage 170 to the reservoir 165 opened to the atmosphere the liquid filling the space between these pistons and the piston 154. A modification of the auxiliary reservoir similar to the reservoir 165 of Fig. 9, is represented in Fig. 10. The auxiliary reservoir 171 is provided with valves 172 and 173. The valve 172 is an automatic one susceptible to move downwards so as to allow liquid to pass from the reservoir 171 to the duct 170. The valve 173 is pressed on its seat by the spring 174 and may be lifted for opening the passage to liquid from the duct 170 into the reservoir 171.

The tension of the spring 174 can be regulated by means of a sliding mantle 175 operated by the handle 176.

The valve 173 acts as a safety valve and adjusts to the load of the train the highest pressure of the braking blocks during the operation. If the pressure in the duct 170 during the braking operation exceeds the predetermined limit corresponding to block pressure; the valve 173 is lifted by the pressure of the fluid pushed forward by the service piston so as to allow fluid to penetrate into the auxiliary reservoir 171.

During the releasing operation, this liquid flows back again into the duct 170 through the automatic valve 172. The highest pressure exerted by the brake blocks depends thus on the tension of the spring 174.

It is obvious that the brake may be released as well as in the arrangement previously shown by operating handle 176 so as to lift the valve 173 by means of the mantle 175 butting against the shoulder 177.

The utilization of an auxiliary reservoir provided with valves, as shown in Figs. 9 and 10, solves another problem which is also of great importance in respect to safety and permanent efficiency of the brakes.

The ordinary brake systems present the defect that the pressure of braking does not remain constant and is not the same for different cars of the train, due to the wear of the blocks and variation of the lost motion between the blocks and the wheels.

In order to remedy this defect an arrangement shown in Fig. 11 can be utilized for always giving the same pressure in all cars by braking, the current in the opposing solenoids being of the same intensity. This arrangement allows a reduction of dimensions of solenoids and air reservoirs. The brakes can also be released in the manner represented in Figs. 9 and 10.

Referring to Fig. 11, the brake cylinder 180 is connected to the cylinder 182 of service magnet 183 and the auxiliary reservoir 184 by way of the passage 181 filled with oil.

The auxiliary reservoir is provided with an automatic valve 185 to be opened manually by means of the handle 186.

The service cylinder 182 is connected to the compressed air reservoir 189 by way of the conduit 187 and the electrically controlled valve 188, oil being interposed (at 190) between the compressed air and the service piston. The rod 196 of the brake piston 191 connected to the transmitting bar 192 is provided at its end with a rack 193 and a detent 194 engaging this rack is connected to a mantle slidable on the rod 196. Two fixed abutments 197 and 198 are provided for limiting the travel of the mantle 195 and consequently, that of the detent 194, said travel corresponding to the angular displacement $b$ of the transmitting bar 192, which is necessary for bringing the brake blocks from the release position to the braking position.

In the usual brake systems, the displacement $b$ varies on account of the wear of blocks and differences of the transmitting mechanisms, but the utilization of the device of Fig. 11 allows holding it sensibly constant for all cars of a long train.

The operation of the device shown in Fig. 11 is as follows: If the displacement of the brake piston 191 during the braking operation, which corresponds to the distance between the abutments 197 and 198 is not sufficient to cause the application of the blocks, the piston 191 will continue its travel under the pressure exerted by the service piston on the oil in the duct 181, until the blocks come in contact with the wheels.

The piston 191 still moving, the mantle 195 provided with the detent 194 will be stopped by the abutment 198 while the piston 191 will advance further, the rack being allowed to pass in this direction under the the detent. This detent 194 will consequently engage at the end of the travel with another tooth of the rack situated nearer to the piston 191.

According to that displacement of the detent 194 the piston 191 will be stopped during its return travel not in its initial position but at a point situated nearer to the abutment 193.

The supplemental quantity of oil required for filling completely the duct 181, rendered necessary by the shifting of the initial position of the piston 191, will be supplied by the auxiliary reservoir 184 through the automatic valve 185.

It will be seen that the brake piston 191 will thus automatically occupy an initial position such that the displacement $b$ is always the same in spite of the lost motion between the block and the wheel, the detent 194 being stopped during the braking operation at a point more or less distant from the piston 191 according to this loss of motion.

The Figs. 12 and 13 show a device for obtaining a considerable reduction of use of electric energy by diminishing to a minimum the ampere turns required for holding the core of the solenoid at the end of its travel.

For this purpose, the oil pressure exerted on the core at the end of its travel may be considerably diminished. To effect this, the area of the core exposed to the oil pressure may be reduced.

According to the Fig. 12, the end of the core 261 is provided with a valve 262 of appropriate area, actuated by a suitable spring 263 to move away from the core, the travel of said valve being limited by a pin 264 passing the slot 265.

A short time before the core 261 reaches the end of its travel, the valve 262 closes the passage 266 leading to the reservoir with oil under pressure and the core 261 continues to move, whereby the spring 263 is compressed. This displacement of the core is continued until a part of the winding of the solenoid has been put in short-circuit as shown in Fig. 13.

After the valve 262 has been closed, the fluid may flow from the space 267 through a passage 268 and an automatic valve 269 to the reservoir.

The automatic valve 268 is adapted to allow fluid to flow from the space 267 to the reservoir and to prevent the same to return in the opposite direction.

It will be readily seen, that when the core arrives at the end of its travel, the oil pressure is exerted but on the area of the valve 262 so that the ampere turns required for holding said valve in its closed position are much reduced.

It is obvious that the valve 262 may be mounted at the end of the conduit leading oil from the reservoir, instead of being carried by the end of the core.

The valves 262 and 269 may also be concentrically disposed instead of being placed at different points of the device.

It will be understood that the invention is not limited to the constructional forms herein described and illustrated and various modifications may be made without exceeding the scope of the invention. Also different arrangements as for instance interposition of intermediate fluid between the brake piston and the service piston, as well as the automatic adjustment of the brake piston to a constant angle of oscillation of the transmitting mechanism may be utilized in brake systems, different from that to which the brake herein described belongs.

What I claim is:

1. In an electro-pneumatic brake system applied to a train, and in which the brake mechanism of each car comprises a cylinder with brake piston, an air pressure reservoir, an electrically operated device comprising solenoids acting against the air pressure, the combination of all the solenoids for releasing the brakes and controlling the valves connected in series or series parallel in one and the same circuit supplied with current by a source independent from the resistance of said circuit, this current being supplied by a series dynamo, whereby the different movements of the brakes are operated by the variations of the intensity of the current.

2. In an electro-pneumatic brake system applied to a train, and in which the brake mechanism of each car comprises a cylinder with brake piston, an air pressure reservoir, an electrically operated device comprising solenoids acting against the air pressure, the combination of all the solenoids for releasing the brakes and controlling the valves connected in series parallel in one and the same circuit supplied with current by a source independent from the resistance of said circuit, this current being supplied by a series dynamo, whereby the different movements of the brakes are operated by the variations of the intensity of the current.

3. In an electro-pneumatic brake system applied to a train and in which the brake mechanism of each car comprises a cylinder with brake piston, an air pressure reservoir, an electrically operated device comprising solenoids acting against the air pressure, means for controlling by the speed of train the variations of the intensity of current flowing through the releasing solenoids and thereupon the pressure of the brake blocks during the braking operation.

4. In an electro-pneumatic brake system applied to a train and in which the brake mechanism of each car comprises a cylinder with brake piston, an air pressure reservoir, an electrically operated device acting against the air pressure the electric energy being supplied by a dynamo driven by a steam engine supplied by the locomotive boiler with the interposition of a reducing valve and releasing solenoids, and means controlling said reducing valve by variations of speed of the train whereby the intensity of current varies in the circuit of said releasing solenoids.

5. In an electro-pneumatic brake system applied to a train and in which the brake mechanism of each car comprises a cylinder with brake piston, an air pressure reservoir, an electrically operated device acting against the air pressure the electric energy being supplied by a dynamo and releasing solenoids, means for controlling by the speed of the train the shunting of a resistance disposed in the magnet field of said dynamo, whereby the intensity of current varies in the circuit of said releasing solenoids.

6. In an electro-pneumatic brake system applied to a train and in which the brake mechanism of each car comprises a cylinder with brake piston, an air pressure reservoir, an electrically operated device comprising solenoids acting against the air pressure the combination of an auxiliary dynamo driven by any axle of the train, said dynamo supplying a current diminishing the magnet field of the principal dynamo so as to control the intensity of the current solenoids by the variation of the speed of the train.

7. An electro-pneumatic brake system applied to a train and in which the brake mechanism of each car comprises a cylinder with brake piston, an air pressure reservoir, an electrically operated device comprising solenoids acting against the air pressure, an intermediate fluid between the releasing solenoid core and a piston operating the transmitting mechanism of the brake blocks, said fluid transmitting the movement of the said core to said piston and vice versa.

8. In an electro-pneumatic brake system applied to a train and in which the brake mechanism of each car comprises a cylinder with brake piston, an air pressure reservoir, an electrically operated device comprising solenoids acting against the air pressure the combination of two or more pistons connected to different transmitting mechanisms of the brake blocks, said pistons being operated by a single solenoid core by means of an intermediate fluid contained in different conduits connecting said cylinders to the cylinders of solenoids.

9. In an electro-pneumatic brake system applied to a train and in which the brake mechanism of each car comprises a cylinder with brake piston, an air pressure reservoir, an electrically operated device acting against the air pressure a piston actuated by the air pressure, one or more brake pistons connected to different transmitting mechanisms of the brake blocks, an intermediate fluid interposed between said pistons, the diameter of said brake pistons being less than that of the piston actuated by the air pressure, said brake pistons being mounted at any distance from the piston actuated by the air pressure, and connected to the same by conduits containing said intermediate fluid.

10. In an electro-pneumatic brake system applied to a train and in which the brake mechanism of each car comprises a cylinder with brake piston, an air pressure reservoir, an electrically operated device comprising solenoids acting against the air pressure an intermediate fluid interposed between the solenoid core of said device and the brake cylinder, the combination of an auxiliary intermediate fluid reservoir opened to the atmosphere and communicating with the conduit containing the intermediate fluid through a connection controlled by a valve adapted so as to be automatically opened in order to allow a certain quantity of the intermediate fluid to enter to the said conduit as soon as a depression would take place in said conduit during the return movement of the transmitting mechanism.

11. In an electro-pneumatic brake system applied to a train and in which the brake mechanism of each car comprises a cylinder with brake piston, an air pressure reservoir, an electrically operated device acting against the air pressure an intermediate fluid disposed between the solenoid core and the brake piston, an auxiliary intermediate fluid reservoir communicating with the intermediate fluid conduit through a connection controlled by a valve said valve being adapted so as to be automatically opened, means for opening manually the said valve by actuating from outward an operative handle or any similar organ.

12. In an electro-pneumatic brake system applied to a train and in which the brake mechanism of each car comprises a cylinder with brake piston, an air pressure reservoir, an electrically operated device comprising solenoids acting against the air pressure an intermediate fluid disposed between the solenoid core and the brake piston, an auxiliary intermediate fluid reservoir communicating with the intermediate fluid conduit, means for limiting the pressure that the said intermediate liquid may transmit to the brake piston, whereby the pressure of brake blocks on the rim of the wheels is limited.

13. In an electro-pneumatic brake system applied to a train and in which the brake mechanism of each car comprises a cylinder with brake piston, an air pressure reservoir, an electrically operated device acting against the air pressure, a solenoid core, an intermediate fluid disposed between the solenoid core and the brake piston, an auxiliary intermediate fluid reservoir communicating with the intermediate fluid conduit and provided with an automatic valve adapted so as to move against the action of a regulated spring as soon as the pressure of the intermediate fluid in said conduit exceeds a predetermined limit whereby a certain quantity of intermediate fluid can flow out of said conduit to said auxiliary reservoir.

14. In an electro-pneumatic brake system applied to a train and in which the brake mechanism of each car comprises a cylinder with brake piston, an air pressure reservoir, an electrically operated device acting against the air pressure, means for realizing the automatic adjustment of the initial position of said piston according to the lost motion between the brake block and the rim of the wheel so that the angular displacement of the transmitting bar would be made independent from the wear of the blocks.

15. In an electro-pneumatic brake system applied to a train and in which the brake mechanism of each car comprises a cylinder with brake piston, an air pressure reservoir, an electrically operated device acting against the air pressure, said piston being provided with a rack, a detent adapted so as to slide upon the said rack when moved in one direction, and two fixed abutments on purpose of limiting the travel of the said detent, said abutments being arranged one from the other at a distance corresponding to the predetermined angular displacement of transmitting bars.

16. In an electro-pneumatic brake system applied to a train and in which the brake mechanism of each car comprises a cylinder with brake piston, an air pressure reservoir, an electrically operated device comprising solenoids acting against the air pressure, means maintaining the solenoids cores in releasing position by means of a current, the ampere windings of which can be reduced when the cores have arrived at the end of their travel whereby the usual electro magnets operating the valves controlling the flow of fluid to the cores may be dispensed with.

17. In an electro-pneumatic brake system applied to a train and in which the brake mechanism of each car comprises a cylinder with brake piston, an air pressure reservoir, a solenoid core exposed to fluid under pressure, an electrically operated device acting against the air pressure means for reducing the areas of the solenoid core exposed to the action of the fluid under pressure, when said core is in its releasing position.

18. In an electro-pneumatic brake system applied to a train and in which the brake mechanism of each car comprises a cylinder with a brake piston, an air pressure reservoir, an electrically operated device acting against the air pressure and having a piston, a valve associated with the piston, said valve closing in the releasing position the passage of the fluid under pressure to the piston, so as to reduce the piston area exposed to the action of the fluid under pressure.

19. In an electro-pneumatic brake system applied to a train and in which the brake mechanism of each car comprises a cylinder with brake piston, an air pressure reservoir, a solenoid core an electrically operated device acting against the air pressure means for allowing the solenoid core to perform a supplementary displacement by opening to the fluid under pressure displaced by the brake piston a derivation conduit communicating with the fluid reservoir and provided with a nonreturn valve.

In testimony whereof I affix my signature.

HENRI PIEPER.